(12) United States Patent
Takebe

(10) Patent No.: US 8,484,446 B2
(45) Date of Patent: Jul. 9, 2013

(54) MICROPROCESSOR SAVING DATA STORED IN REGISTER AND REGISTER SAVING METHOD

(75) Inventor: Yoshimasa Takebe, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 889 days.

(21) Appl. No.: 12/076,857

(22) Filed: Mar. 24, 2008

(65) Prior Publication Data

US 2008/0282071 A1    Nov. 13, 2008

(30) Foreign Application Priority Data

May 8, 2007    (JP) .................................. 2007-123900

(51) Int. Cl.
  *G06F 12/02*    (2006.01)
(52) U.S. Cl.
  USPC ....................................................... 712/228
(58) Field of Classification Search
  None
  See application file for complete search history.

(56) References Cited

U.S. PATENT DOCUMENTS

| | | | | |
|---|---|---|---|---|
| 3,566,369 A * | 2/1971 | Chinlund | ...................... | 712/228 |
| 3,781,810 A * | 12/1973 | Downing | ...................... | 712/228 |
| 4,241,399 A * | 12/1980 | Strecker et al. | ............... | 712/228 |
| 4,338,663 A * | 7/1982 | Strecker et al. | ............... | 712/228 |
| 4,562,537 A * | 12/1985 | Barnett et al. | ................ | 712/221 |
| 5,021,993 A * | 6/1991 | Matoba et al. | ................ | 712/228 |
| 5,241,679 A * | 8/1993 | Nakagawa et al. | ........... | 710/260 |
| 5,414,864 A * | 5/1995 | Koizumi | ....................... | 712/228 |
| 5,542,060 A | 7/1996 | Yoshida | | |
| 5,564,031 A * | 10/1996 | Amerson et al. | ............... | 711/209 |
| 5,974,538 A * | 10/1999 | Wilmot, II | .................... | 712/218 |
| 6,157,999 A * | 12/2000 | Rossbach et al. | ............. | 712/243 |
| 6,212,630 B1 * | 4/2001 | Takayama et al. | ............ | 712/242 |
| 6,314,513 B1 * | 11/2001 | Ross et al. | .................... | 712/228 |
| 6,442,751 B1 * | 8/2002 | Cocchi et al. | ................. | 717/133 |
| 6,449,709 B1 * | 9/2002 | Gates | ........................... | 712/202 |
| 6,604,193 B1 * | 8/2003 | Shimada et al. | .............. | 712/228 |
| 7,007,134 B2 | 2/2006 | Suetake | | |
| 7,222,219 B2 * | 5/2007 | Matsuda | ....................... | 711/137 |
| 7,844,804 B2 * | 11/2010 | Rychlik | ........................ | 712/228 |
| 2002/0056024 A1 * | 5/2002 | Bui | .............................. | 711/118 |

(Continued)

FOREIGN PATENT DOCUMENTS

| | | |
|---|---|---|
| JP | 57-200983 | 12/1982 |
| JP | 01-217635 | 8/1989 |

(Continued)

OTHER PUBLICATIONS

Patent Abstract of Japan, Publication No. 59-135551, Publication Date: Aug. 3, 1984.

(Continued)

*Primary Examiner* — Eric Coleman
(74) *Attorney, Agent, or Firm* — Fujitsu Patent Center

(57) ABSTRACT

A microprocessor which realizes fast register saving and restoring which are involved in subroutine calls, and is capable of reducing the scale of a program. A register file is provided with at least one register for storing data to be used for computational processing. A saving memory stores therein data saved from the registers. A saving control unit saves data from a writing destination register to the saving memory when an instruction to write to the register is executed in a subroutine. Then the saving control unit restores data saved in the saving memory back to the original registers when an instruction to return from the subroutine is executed.

8 Claims, 15 Drawing Sheets

U.S. PATENT DOCUMENTS

| | | | |
|---|---|---|---|
| 2002/0194459 A1* | 12/2002 | Kissell et al. | 712/228 |
| 2004/0103252 A1* | 5/2004 | Lee et al. | 711/132 |
| 2004/0133766 A1* | 7/2004 | Abraham et al. | 712/217 |
| 2005/0015561 A1* | 1/2005 | Matsuda | 711/167 |
| 2005/0102494 A1* | 5/2005 | Grochowski et al. | 712/228 |
| 2005/0138340 A1* | 6/2005 | Lee et al. | 712/228 |
| 2007/0094484 A1* | 4/2007 | Rychlik | 712/228 |
| 2007/0106885 A1* | 5/2007 | Rychlik | 712/228 |

FOREIGN PATENT DOCUMENTS

| | | |
|---|---|---|
| JP | 03-053327 | 3/1991 |
| JP | 04-260930 | 9/1992 |
| JP | 04-338825 A | 11/1992 |
| JP | 11-167494 | 6/1999 |
| JP | 2003-256277 | 9/2003 |

OTHER PUBLICATIONS

Patent Abstract of Japan, Publication No. 03-191426, Publication Date: Aug. 21, 1991.

Japanese Office Action mailed Dec. 6, 2011 for corresponding Japanese Application No. 2007-123900, with partial English-language translation.

"Japanese Office Action" mailed by JPO and corresponding to Japanese application No. 2007-123900 on Sep. 4, 2012, with partial English translation.

* cited by examiner

```
                                60 SOURCE CODE define N 1000 int average (int a[ ]) {
       int i, sum;                    ⎫
       sum = 0;                       ⎬ 61
                                      ⎭
       for (i = 0; i < N; i++) {      ⎫
           sum = sum + a[i];          ⎬ 62
       }                              ⎭ sum = sum / N;   ------------- 63 return sum;      ------------- 64
   }
```

FIG. 9

70 ASSEMBLY CODE

```
_Average:

/*
    subi    sp, #48, sp              ; move stack frame
    sti     fp, @(sp, 8)             ; save frame pointer
    addi    sp, #8, fp               ; update frame pointer sti     r12, @(fp, -4)           ; save register
    sti     r13, @(fp, -8)           ; save register
    sti     r14, @(fp, -12)          ; save register
*/
    set     #0, r12                  ; initialize loop counter
    set     #0, r13                  ; initialize sum _loop:
    cmp     r12, #1000, cc0          ; loop end ?
    beq     cc0, _exit ld      @(r8, 0), r14            ; load a[i]
    add     r13, r14, r13            ; sum = sum + a[i]
    addi    r12, #1, r12             ; i++
    br      _loop
_exit:
    divi    r13, #1000, r8           ; sum = sum / N /*
    ldi     @(fp, -12), r14          ; restore register
    ldi     @(fp, -8), r13           ; restore register
    ldi     @(fp, -4), r12           ; restore register mov     fp, sp
    ld.p    @(fp, gr( )), fp         ; restore frame pointer
    addi.p  sp, #40, sp              ; re-move stack frame
*/ ret
```

MICROPROCESSOR SAVING DATA STORED IN REGISTER AND REGISTER SAVING METHOD

CROSS-REFERENCE TO RELATED APPLICATIONS

This application is based upon and claims the benefits of priority from the prior Japanese Patent Application No. 2007-123900, filed on May 8, 2007, the entire contents of which are incorporated herein by reference.

BACKGROUND OF THE INVENTION (1) Field of the Invention

This invention relates to a microprocessor and a register saving method, and more particularly to a microprocessor capable of executing a program including subroutine calls and a register saving method that is executed by the microprocessor.

(2) Description of the Related Art

General microprocessor has a large number of registers therein. The registers are used to temporarily store data read from external memories or computational processing results. In addition, various addresses to be used for accessing the external memories are stored. Since the registers operate faster, as compared with the external memories, the computational processing can be accelerated by making the best use of the registers. Especially, registers usable for various purposes by programs are called general purpose registers.

By the way, a program to be executed by a microprocessor may include subroutine calls as well as sequential instruction executions. A subroutine is executed independently of an instruction calling the subroutine in the program, and there are variables (automatic variables) which are used only in the subroutine. Therefore, when a subroutine is called, data stored in registers which may be used in execution of the subroutine should be saved. On returning from the subroutine, the saved data should be restored back to the original registers.

In general, the register saving/restoring is performed by a program in which data movement between a register and an external memory is explicitly defined. That is, on the register saving, the program moves data from the register to a stack frame of the external memory, and at the same time updates various addresses in the register accordingly. Then, on the register restoring, the program moves the data from the stack frame to the original register and changes the various addresses back to the original state in the register (for example, refer to Japanese Unexamined Patent Application Publication No. 03-191426 and Japanese Unexamined Patent Application Publication No. 59-135551).

However, the conventional register saving/restoring method has a drawback that a cost for the saving/restoring process increases in proportional to the number of registers that are used in execution of subroutines. That is to say, since a program needs to successively access slow-speed external memories, a time for the saving/restoring process is increased. In addition, since one instruction is required for moving data from one register, the scale of the program is also increased. Especially, this problem is a big issue recently because more general purpose registers are provided in a microprocessor and more general purpose registers are used for computational processing.

SUMMARY OF THE INVENTION

According to one aspect of an embodiment, a microprocessor capable of executing a program including calling of a subroutine comprises: a register file provided with at least one register for storing data to be used for computational processing; a saving memory for storing therein data saved from the registers; a saving control unit for saving data stored in a writing destination register to the saving memory when an instruction to write to the writing destination register is executed in the subroutine, and for restoring data saved in the saving memory back to the original registers when an return instruction to return from the subroutine is executed.

According to another aspect of an embodiment, in a register saving method to be executed by a microprocessor that is provided with at least one register for storing data to be used for computational processing and is capable of executing a program including calling of a subroutine, when an instruction to write to a register is executed in the subroutine, data stored in the writing destination register is saved to a saving memory provided in the microprocessor, and when a return instruction to return from the subroutine is executed, data saved in the saving memory is restored back to the original registers.

BRIEF DESCRIPTION OF THE DRAWINGS

FIG. 9 shows an example of source code of a program.

FIG. 10 shows an example of assembly code of the program.

DESCRIPTION OF THE PREFERRED EMBODIMENTS

Preferred embodiments of this invention will be described with reference to the accompanying drawings.

First Embodiment

Figure 1:
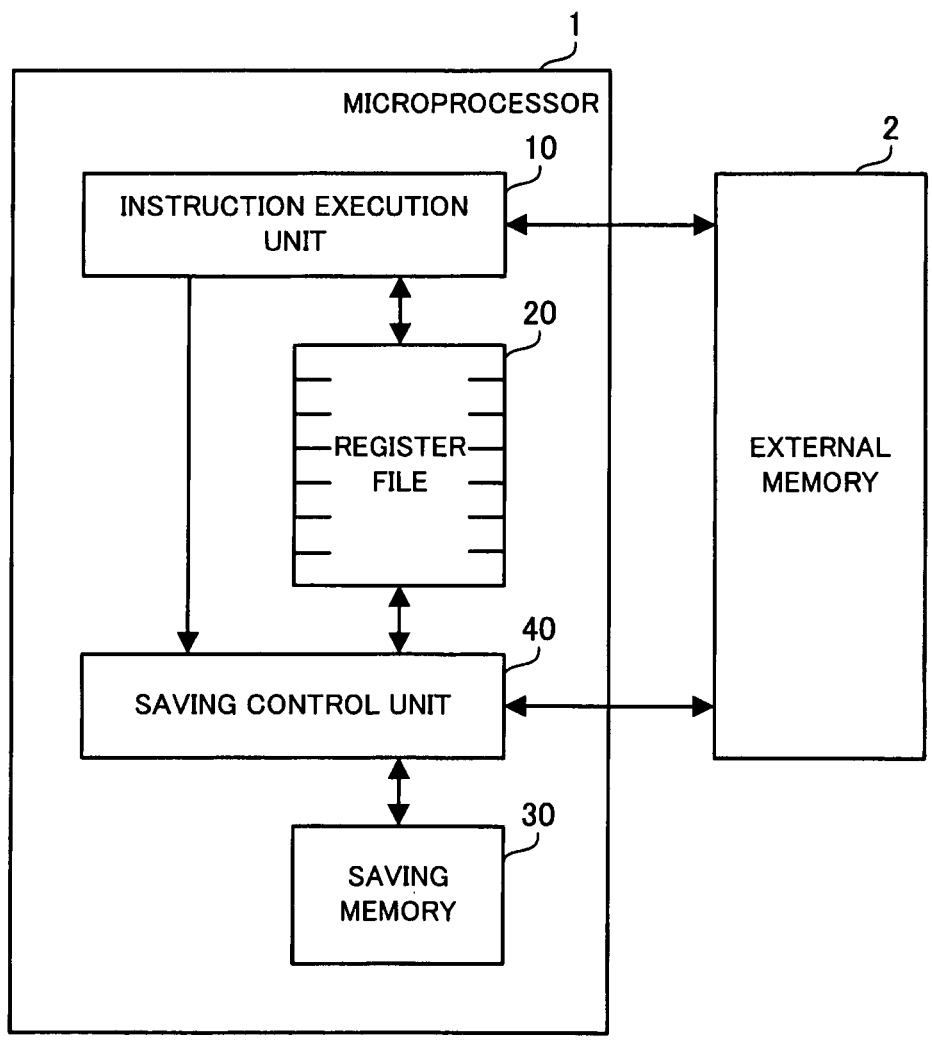
FIG. 1 is a block diagram showing the outline of a microprocessor.

FIG. 1 is a block diagram showing the outline of a microprocessor. The microprocessor 1 shown in FIG. 1 is capable of executing a program including subroutine calls. The microprocessor 1 is connected to an external memory 2. The external memory 2 is a memory that functions as a main memory or a cache memory, and comprises a Random Access Memory (RAM) or a flash memory. The microprocessor 1 includes an instruction execution unit 10, a register file 20, a saving memory 30, and a saving control unit 40.

The instruction execution unit 10 sequentially reads and decodes instruction codes from the external memory 2. Then the instruction execution unit 10 executes the instructions according to the decoding results. The instructions include an instruction to read data from the external memory 2 (storing instruction), an instruction to write data to the external memory 2 (saving instruction), an arithmetic logic calculation instruction, an instruction to call a subroutine (call instruction), and an instruction to return from the subroutine (return instruction). The instruction execution unit 10 stores and uses various kinds of data in general purpose registers of the register file 20.

The register file 20 is provided with at least one general purpose register. The general purpose register is capable of storing data of prescribed length. Each general purpose register is identified by a unique identification number. In this embodiment, it is assumed that the register file 20 has 32 general purpose registers each capable of storing 32-bit data. In addition, it is assumed that reading from three general purpose registers and writing to one general purpose register can be performed at the same time.

In the saving memory 30, data from the general purpose registers of the register file 20 is saved. If subroutines are called in hierarchical fashion, the data saved at all call levels is accumulated in the saving memory 30.

The saving control unit 40 receives the contents of a decoded instruction from the instruction execution unit 10. If the instruction is to write data to one general purpose register of the register file 20, the saving control unit 40 saves the data stored in the writing destination general purpose register to the saving memory 30 while executing the instruction. If the instruction is a return instruction, the saving control unit 40 restores the saved data from the saving memory 30 back to the original general purpose register.

In this connection, the saving control unit 40 retains map data showing the saving states of the registers, so as to perform data restoring based on the map data. If the saving memory 30 runs out of its memory space due to subroutine calls in hierarchical fashion, the saving control unit 40 moves data stored in the saving memory 30 to the external memory 2, to thereby secure a memory space on the saving memory 30.

Figure 2:
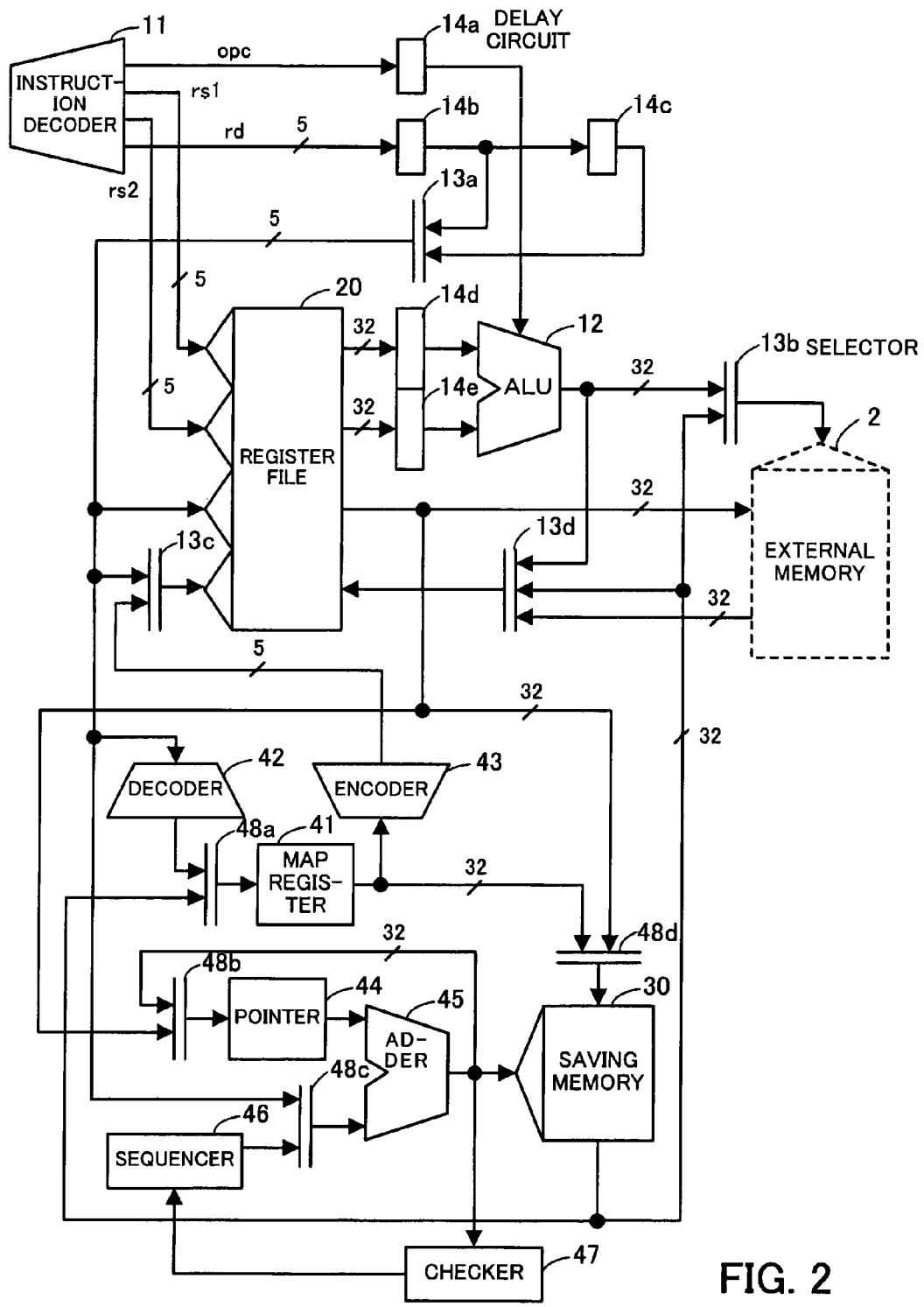
FIG. 2 shows an example of the circuit configuration of the microprocessor.

FIG. 2 shows an example of the circuit configuration of a microprocessor. The circuit configuration shown in FIG. 2 illustrates the instruction execution unit 10 and the saving control unit 40 in more detail. The instruction execution unit 10 includes an instruction decoder 11, an arithmetic and logical unit (ALU) 12, selectors 13a to 13d, and delay circuits 14a to 14e. The saving control unit 40 includes a map register 41, a decoder 42, an encoder 43, a pointer 44, an adder 45, a sequencer 46, a checker 47, and selectors 48a to 48d. It should be noted that circuits for controlling the selectors 13a to 13d and the selectors 48a to 48d are not illustrated in FIG. 2.

The instruction decoder 11 obtains and decodes an instruction code, which was previously read from the external memory 2, from an unillustrated instruction register. Then the instruction decoder 11 outputs an instruction (opc) for the ALU 12, the register numbers (rs1 and rs2) of general purpose registers storing input data, and the register number (rd) of a general purpose register to write therein an instruction execution result. The instruction for the ALU 12 is temporarily stored in the delay circuit 14a. The register number of the general purpose register to write therein the execution result is temporarily stored in the delay circuit 14b. The data read from the general purpose registers is temporarily stored in the delay circuits 14c and 14d.

The ALU 12 is a computation circuit that is capable of performing arithmetic calculation and logic calculation. The ALU 12 performs calculation by using data read from general purpose registers of the register file 20 in accordance with instructions received from the instruction decoder 11. Then the ALU 12 writes the calculation result in a specified general purpose register.

The map register 41 retains map data. The map data is a collection of flags that have one-to-one correspondence with the general purpose registers of the register file 20. When an instruction to write to a general purpose register is executed, that is, when data is saved, the map register 41 sets a flag corresponding to the general purpose register to "1" in the map data. When a call instruction is executed, the map register 41 saves the retained map data to the saving memory 30 and initializes the map data retained therein. Then when a return instruction is executed, the map register 41 acquires the map data which has been saved in the saving memory 30, and retains it again.

The decoder 42 decodes a register number represented in 5 bits, into a bit pattern of 32 bits where any one digit is "1". For example, the decoder 42 decodes "00111" (7) into "00000000000000000000000010000000". By using the bit pattern obtained by the decoder 42 through the decoding, the map data retained in the map register 41 is updated.

The encoder 43 sequentially outputs the register numbers of general purpose registers whose flags are "1" in the map data retained in the map register 41, in a decreasing order of register number. The register number to be output this time is represented in 5 bits. That is to say, the encoder 43 performs a reverse process of the decoder 42.

The pointer 44 retains an address indicating a position on the saving memory 30, or an address indicating the top of a memory space secured for a subroutine currently executed. The pointer 44 sets the address to indicate the top of the memory space secured for a subroutine to be called when a call instruction is executed. Then, when a return instruction is executed, the pointer 44 sets the address to indicate the top of the memory space secured for a subroutine or main routine calling the subroutine.

In addition, when data is moved between the saving memory 30 and the external memory 2, the pointer 44 sequentially increments the address, so that the address indicates a position to be accessed next in the saving memory 30. Then when the data movement is completed, the pointer 44 sets the address to indicate the top of the memory space secured for the subroutine currently executed.

The adder 45 is a calculation circuit for calculating an address to be used for accessing the saving memory 30. More specifically, the adder 45 calculates an address that indicates the top of a memory space secured for a subroutine to be called and gives the address to the pointer 44 when a call instruction is executed.

Further, when an instruction to write to a general purpose register is executed, the adder 45 calculates an address that indicates a position where saved data should be stored, based on the address set in the pointer 44 and the register number indicating a writing destination, and gives the address to the saving memory 30. Furthermore, when a return instruction is executed, the adder 45 calculates an address that indicates a position where saved data is stored, based on the address set in the pointer 44 and the register number of a general purpose register to be restored, and gives the address to the saving memory 30.

The sequencer 46 supplies to the adder 45 a signal for controlling sequential movement of data that is performed in order from the data at the top of the saving memory 30, when the data is moved between the saving memory 30 and the external memory 2.

The checker 47 monitors the address to be supplied from the adder 45 to the saving memory 30, and when determining that the saving memory 30 is a lack of free space, notifies the sequencer 46 of this matter. Then, under the control of the sequencer 46, data is moved from the saving memory 30 to the external memory 2. In addition, when the checker 47 determines that the saving memory 30 is empty, it notifies the sequencer 46 of this matter. Then, under the control of the sequencer 46, data is returned from the external memory 2 to the saving memory 30.

Figure 3:
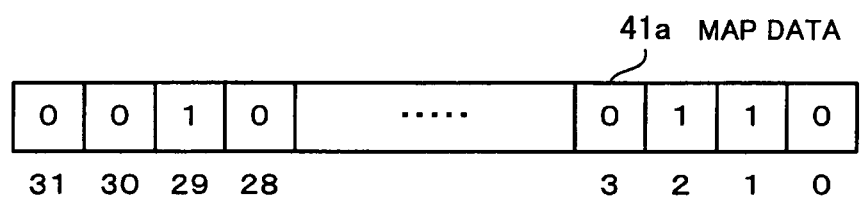
FIG. 3 shows an example of the data structure of map data.

FIG. 3 shows an example of the data structure of map data. The map data 41a is retained in the map register 41. The map data 41a is a bit sequence of 32 bits. The least significant bit of the bit sequence corresponds to a general purpose register numbered 0 while the most significant bit corresponds to a general purpose register numbered 31. All bits in the map data 41a is set to "0" at the initial state. Then every time when an instruction to write to a general purpose register is executed, a bit corresponding to the writing destination general purpose register is set to "1".

Figure 4:
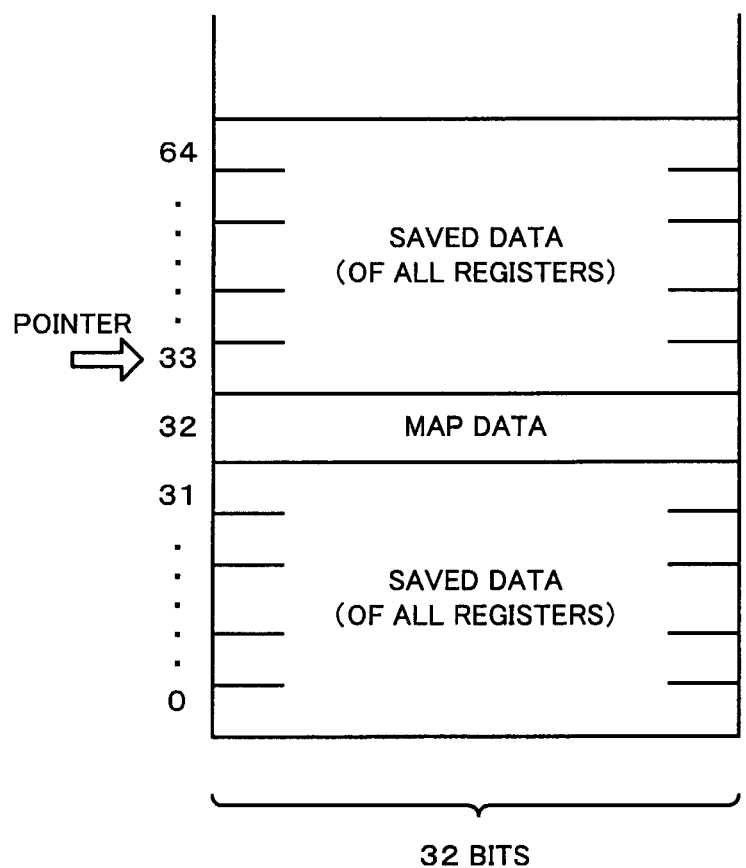
FIG. 4 shows an example of the data structure of saved data according to the first embodiment.

FIG. 4 shows an example of the data structure of saved data according to the first embodiment. Referring to FIG. 4, one row represents 32-bit data and a numerical value in vertical direction represents the number of a row. The data shown in FIG. 4 is stored in the saving memory 30.

In the saving memory 30, a memory space for all general purpose registers of the register file 20 is secured when a subroutine is called. That is, a memory space of 32 bits×32 (the number of general purpose registers) is secured every time when a subroutine is called. The data stored in a general purpose register is saved at a position corresponding to the register number of the general purpose register. When a subroutine is called, the map data retained in the map register 41 is also saved to the saving memory 30. This makes it possible to deal with calling subroutines in hierarchical fashion.

For example, when a subroutine is called in a situation where the saving memory 30 is used up to the 31st row, the current map data is stored on the 32nd row. Then a memory space from the 33rd row to the 64th row is secured for the new subroutine. At this time, the value of the pointer 44 indicates the 33rd row which is the top of the secured memory space. Thus the saved data of the general purpose register numbered 0 is stored on the 33rd row and the saved data of the general purpose register numbered 31 is stored on the 64th row.

The following describes a flow of a process to be executed in the microprocessor configured as described above. The processing flow below can be realized mainly by controlling the selectors 13a to 13d and the selectors 48a to 48d shown in FIG. 2.

Figure 5:
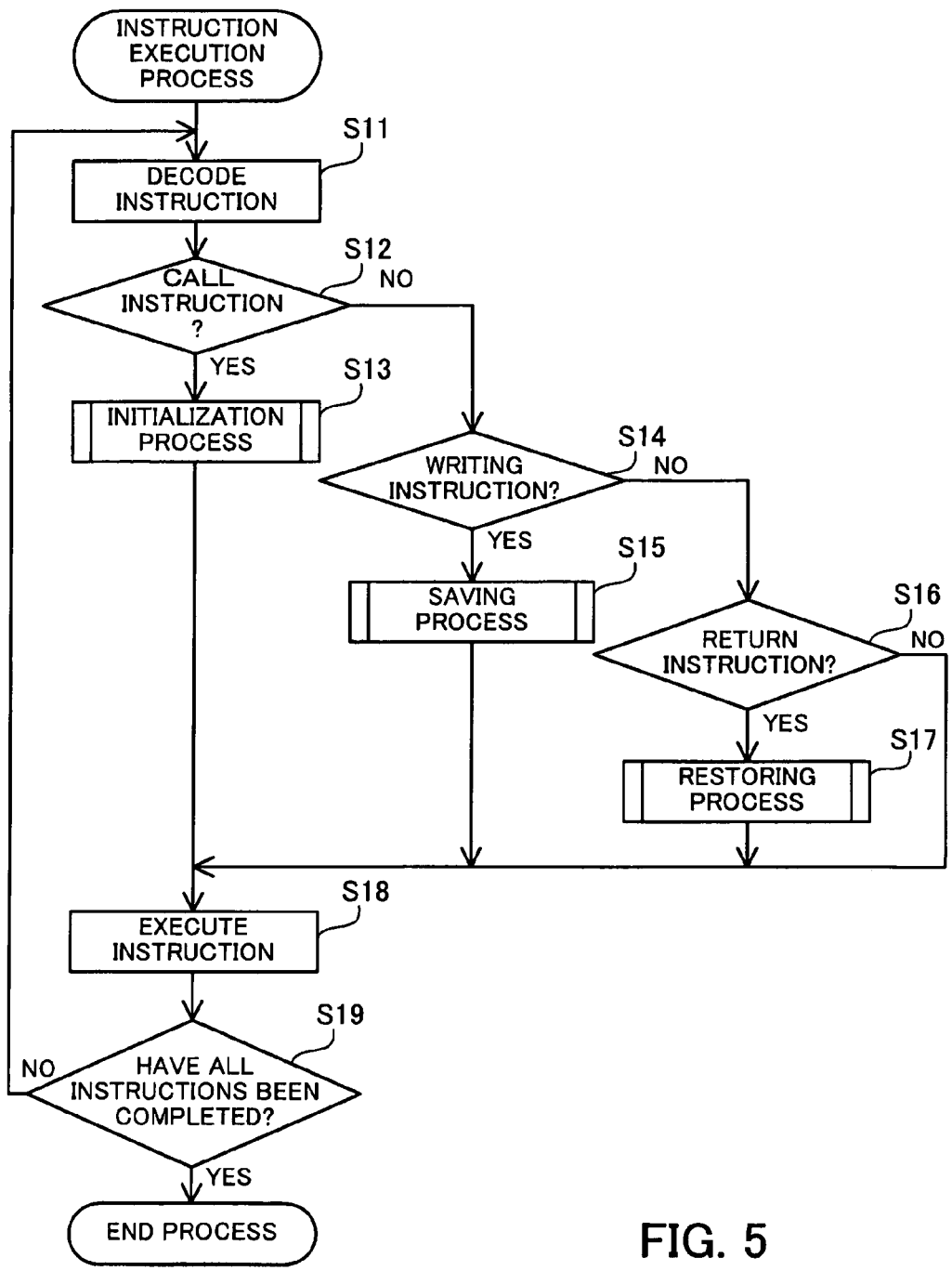
FIG. 5 is a flowchart of an instruction execution process.

FIG. 5 is a flowchart of an instruction execution process. This procedure shown in FIG. 5 will be described step by step.

At step S11, the instruction execution unit 10 decodes an instruction code read from the external memory 2. Then the instruction execution unit 10 notifies the saving control unit 40 of the decoding result.

At step S12, the saving control unit 40 determines whether the instruction to be executed by the instruction execution unit 10 is a call instruction. If this determination results in yes, this procedure goes on to step S13. Otherwise, the procedure goes on to step S14.

At step S13, the saving control unit 40 initializes map data. This initialization process will be described later. In this connection, this process can be executed at step S18.

At step S14, the saving control unit 40 determines whether the instruction to be executed by the instruction execution unit 10 is an instruction involving writing to a general purpose register. If this determination results in yes, the procedure goes on to step S15. Otherwise, the procedure goes on to step S16.

At step S15, the saving control unit 40 saves data stored in the writing destination general purpose register to the saving memory 30. This saving process will be described in detail later. In this connection, this process can be executed at step S18.

At step S16, the saving control unit 40 determines whether the instruction to be executed by the instruction execution unit 10 is a return instruction. If this determination results in yes, the procedure goes on to step S17. Otherwise, the procedure goes on to step S18.

At step S17, the saving control unit 40 restores data which was saved in the saving memory 30 for execution of the subroutine from which the returning is executed. This restoring process will be described in detail later. In this connection, this process can be executed at step S18.

At step S18, the instruction execution unit 10 performs computational processing according to the decoding result obtained at step S11.

At step S19, the instruction execution unit 10 determines whether instructions included in the program have been completed to the end. If this determination results in yes, the procedure is completed. Otherwise, the procedure goes back to step S11.

As described above, the saving control unit 40 automatically performs appropriate processes when the instruction execution unit 10 executes a call instruction, an instruction involving writing to a general purpose register, and a return instruction. The following describes the initialization process at step S13, the saving process at step S15, and the restoring process at step S17.

Figure 6:
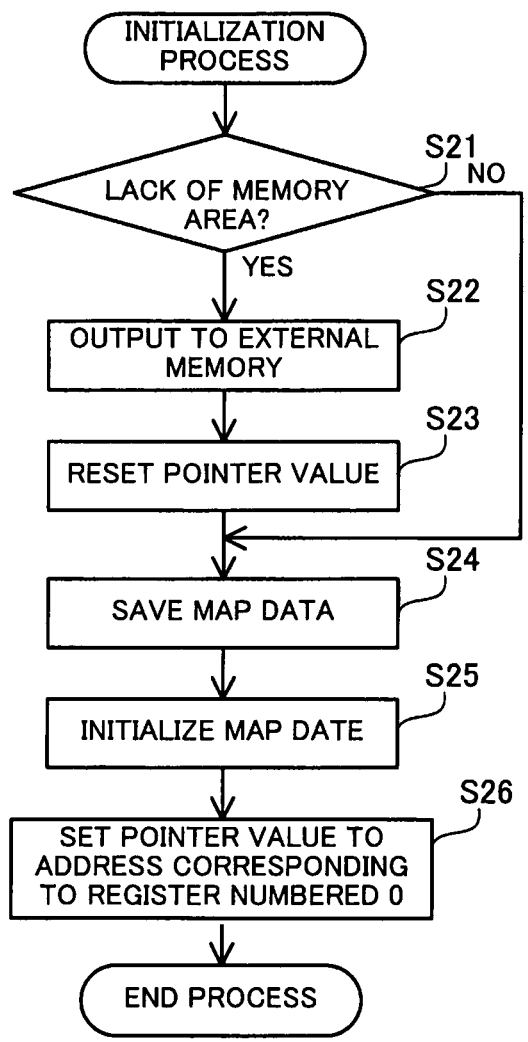
FIG. 6 is a flowchart of an initialization process according to the first embodiment.

FIG. 6 is a flowchart of the initialization process according to the first embodiment. The procedure shown in FIG. 6 will be described step by step.

At step S21, the saving control unit 40 determines whether the saving memory 30 is a lack of memory space for storing map data and saved data for execution of a next subroutine. This is determined based on whether the checker 47 has informed the sequencer 46 of the lack. If this determination results in yes, the procedure goes on to step S22. Otherwise, the procedure goes on to step S24.

At step S22, the saving control unit 40 moves data stored in the saving memory 30 to the external memory 2 in order from the first data. This data movement is realized, under the control of the sequencer 46, by sequentially incrementing the address set in the pointer 44 and supplying it to the saving memory 30.

At step S23, the saving control unit 40 initializes the address set in the pointer 44 to indicate the top of the saving memory 30, that is, to "0".

At step S24, the saving control unit 40 saves the map data from the map register 41 to the saving memory 30.

At step S25, the saving control unit 40 initializes the map data retained in the map register 41. Thereby, all bits of the map data are set to "0".

At step S26, the saving control unit 40 sets the address set in the pointer 44 to an address that indicates a position for storing the saved data of the general purpose register numbered 0.

As described above, when a call instruction is executed, the saving control unit 40 initializes the map data after saving it to the saving memory 30. In addition, the saving control unit 40 sets the pointer value to indicate the top of a memory space secured for the next subroutine. If the saving memory 30 is a lack of free space, the saving control unit 40 moves data stored in the saving memory 30 to the external memory 2 to thereby secure a free space.

Figure 7:
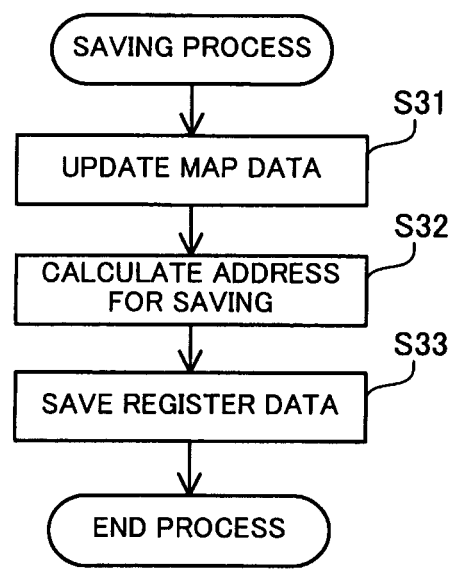
FIG. 7 is a flowchart of a saving process according to the first embodiment.

FIG. 7 is a flowchart of the saving process according to the first embodiment. The procedure shown in FIG. 7 will be described step by step.

At step S31, the saving control unit 40 sets a bit corresponding to a writing destination general purpose register, to "1" in the map data. This can be realized by calculating a logical OR operation of a bit pattern which is obtained by the decoder 42 and corresponds to the register number of the writing destination general purpose register, and the current map data.

At step S32, the saving control unit 40 calculates an address on the saving memory 30 for storing saved data. This is calculated by the adder 45 based on the address set in the pointer 44 and the register number of the writing destination general purpose register. The calculated address is supplied to the saving memory 30.

At step S33, the saving control unit 40 reads data stored in the general purpose register before overwriting it, and supplies the data to the saving memory 30. The saving memory 30 writes this data at a position specified by the address given at step S32.

As described above, when an instruction involving writing to a general purpose register is executed, the saving control unit 40 reads and saves data stored in the writing destination general purpose register to the saving memory 30. In addition, the saving control unit 40 records execution of this saving in the map data.

Figure 8:
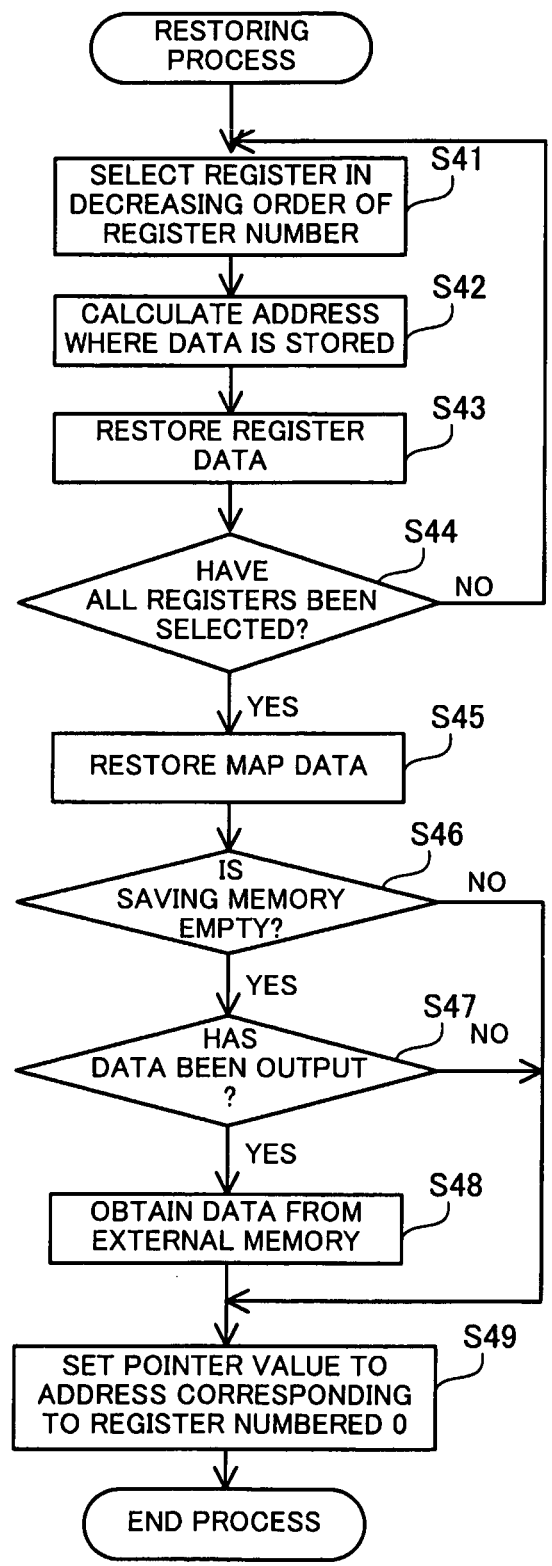
FIG. 8 is a flowchart of a restoring process according to the first embodiment.

FIG. 8 is a flowchart of the restoring process according to the first embodiment. This procedure shown in FIG. 8 will be described step by step.

At step S41, the saving control unit 40 selects one of the general purpose registers data of which has been saved, in decreasing order of register number, based on the map data retained in the map register 41.

At step 42, the saving control unit 40 calculates an address on the saving memory 30 storing the saved data corresponding to the general purpose register selected at step S41. This is calculated by the adder 45 based on the address set in the pointer 44 and the register number of the general purpose register. The calculated address is supplied to the saving memory 30.

At step S43, the saving control unit 40 reads from the saving memory 30 data stored at the address obtained by the calculation at step S42. Then the saving control unit 40 stores the read data in the general purpose register selected at step S41. This is realized by the encoder 43 supplying the register number of the general purpose register to the register file 20.

At step S44, the saving control unit 40 determines whether all general purpose registers from which data was saved, have been selected at step S41. If this determination results in yes, this procedure goes on to step S45. Otherwise, the procedure goes back to step S41.

At step S45, the saving control unit 40 obtains the previous map data from the saving memory 30, and supplies it to the map register 41.

At step S46, the saving control unit 40 determines whether the saving memory 30 is empty. This is determined based on whether the checker 47 has informed the sequencer 46 of the memory state. If this determination results in yes, the procedure goes on to step S47. Otherwise, the procedure goes onto step S49.

At step S47, the saving control unit 40 determines whether there is data which has been moved from the saving memory 30 to the external memory 2. If this determination results in yes, the procedure goes on to step S48. Otherwise, the procedure goes on to step S49.

At step S48, the saving control unit 40 returns the data, which was originally stored in the saving memory 30, from the external memory 2 to the saving memory 30. This is realized, under the control of the sequencer 46, by sequentially incrementing the address set in the pointer 44 and supplying it to the saving memory 30.

At step S49, the saving control unit 40 sets the address set in the pointer 44 to indicate a position for storing the saved data of the general purpose register numbered 0.

As described above, when the return instruction is executed, the saving control unit 40 returns the data, which has been saved in the saving memory 30, to the original general purpose registers based on the current map data. Then, the previous map data which has been saved in the saving memory 30 is also restored back to the map register 41. At this time, if the saving memory 30 becomes empty and there is data which has been moved from the saving memory 30 to the external memory 2, the saving control unit 40 returns the data from the external memory 2 to the saving memory 30.

Now, a program to be executed by the microprocessor 1 will be described.

FIG. 9 shows an example of source code of a program. The source code 60 shown in FIG. 9 is created by a program developer. In the source code 60, a function "average" for calculating an average of 1000 integral values which are input as arguments is described. The sentences included in this function are divided into four code sections 61 to 64.

The code section 61 describes a sentence stating integral variables "i" and "sum", and also describes a process of setting the variable "sum" to "0 as an initial value. The code section 62 describes a process of calculating a sum of 1000 integral values. The code section 63 describes a process of calculating an average by dividing the sum by the number of integral values. The code section 64 describes a process of outputting the calculated average as a return value of this function.

FIG. 10 shows an example of assembly code of a program. The assembly code 70 shown in FIG. 10 is obtained by compiling the source code 60 of FIG. 9 with a compiler corresponding to the microprocessor 1. The assembly code 70 describes a subroutine corresponding to the function "average". The assembly code 70 is divided into six code sections 71 to 76.

The code section 71 describes a process of moving data stored in the general purpose registers r12, r13, and r14 (general purpose registers numbered 12, 13, and 14 of the register file 20) to be temporarily used in the subroutine, to a stack frame of the external memory 2, and also describes a process of updating the value of a frame pointer that indicates the top of the stack frame.

In this connection, the codes of the code section 71 are commented out. That is, in actual, the microprocessor 1 does not perform these processes. The microprocessor 1 automatically saves data of general purpose registers, and does not need explicit instructions from the program. However, it should be noted that an existing general microprocessor needs these codes to perform the same processes.

The code section 72 describes a process of setting an initial value "0" in the general purpose registers r12 and r13. The code section 72 corresponds to the code section 61 of the source code 60. At this time, the general purpose register r12 has the valuable "i", and the general purpose register r13 has the valuable "sum".

The code section 73 describes a process of repeatedly performing 1000 times a process of reading an integral value from the external memory 2 and adding it to the general purpose register r13. The code section 73 corresponds to the code section 62 of the source code 60. Thereby the sum of 1000 integral values is stored in the general purpose register r13.

The code section 74 describes a process of calculating an average by dividing the sum of 1000 integral values by 1000. The code section 74 corresponds to the code section 63 of the source code 60.

The code section 75 describes a process of acquiring the data of the general purpose registers r12, r13, and r14, which was saved with the process of the code section 71, from the stack frame of the external memory 2, and returning it back. In addition, it also describes a process of updating the vale of the frame pointer indicating the top of the stack frame.

It should be noted that, similarly to the code section 71, the codes of the code section 75 are commented out. That is, in actual, the microprocessor 1 does not perform these processes. The microprocessor 1 automatically performs restoring of general purpose registers, and does not need explicit instructions from the program. However, it should be noted that an existing general microprocessor requires these codes to perform the same processes.

The code section 76 describes a return instruction to return from this subroutine. The code section 76 corresponds to the code section 64 of the source code 60.

When the instruction execution unit 10 starts to execute the program indicated by the assembly code 70, the saving control unit 40 automatically saves data stored in the general purpose registers numbered 12, 13, and 14 of the register file 20 to the saving memory 30 at the time of writing. In addition, when a return instruction is executed, the saving control unit 40 automatically restores the data from the saving memory 30 back to the original general purpose registers numbered 12, 13, and 14.

In the example shown in FIG. 10, the code sections 71 and 75 are commented out. However, these codes can be deleted completely. This can reduce a scale of the program.

With such a microprocessor, the saving/restoring process can be performed in parallel to computational processing, which can greatly improve the processing efficiency. In addition, explicit instructions for data movement are not necessarily described in a program, which can greatly reduce the scale of the program.

Further, the saved data and the map data are accumulated in the saving memory. This makes it possible to flexibly deal with calling subroutines in hierarchical fashion. If the saving memory is a lack of free space, data is automatically moved therefrom to the external memory. Therefore, the saving memory does not necessarily have an extremely large memory capacity.

Still further, the saving position on the saving memory corresponding to a general purpose register is determined when a subroutine is called, which can simplify saving and restoring control and also prevent complexity of circuit configuration.

Second Embodiment

The second embodiment will now be described. In the second embodiment, data saved in a saving memory is managed in a different manner from the first embodiment. The different points from the first embodiment will be mainly described and the same features will not be repeatedly described. A microprocessor according to the second embodiment has the same configuration as that of the first embodiment, and the same reference numerals apply.

Figure 11:
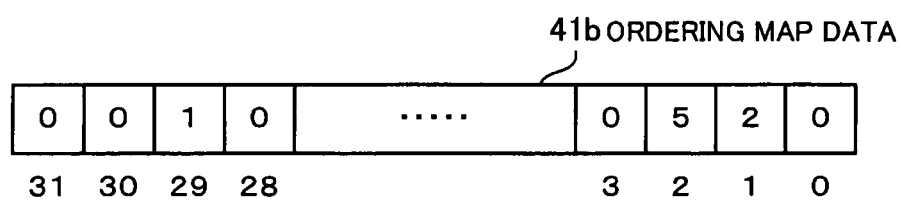
FIG. 11 shows an example of the data structure of ordering map data.

FIG. 11 shows an example of the data structure of ordering map data. The ordering map data 41b shown in FIG. 11 is data that is managed by a saving control unit 40, and corresponds to the map data 41a of the first embodiment shown in FIG. 3.

The ordering map data 41b comprises a series of 32 integral values that are zero or greater. The least significant value of the series corresponds to a general purpose register numbered 0 and the most significant value corresponds to a general purpose register numbered 31. All of the integral values of the ordering map data 41b are set to "0" as initial values. Then every time when an instruction to write to a general purpose register is executed, a column corresponding to the writing destination general purpose register is set to a value indicating an order of saving in the subroutine.

For example, consider a case where a call instruction is executed, and a general purpose register numbered 29 and then a general purpose register numbered 1 are saved. In this case, a column corresponding to the register number 29 is set to "1" and then a column corresponding to the register number 1 is set to "2".

Figure 12:
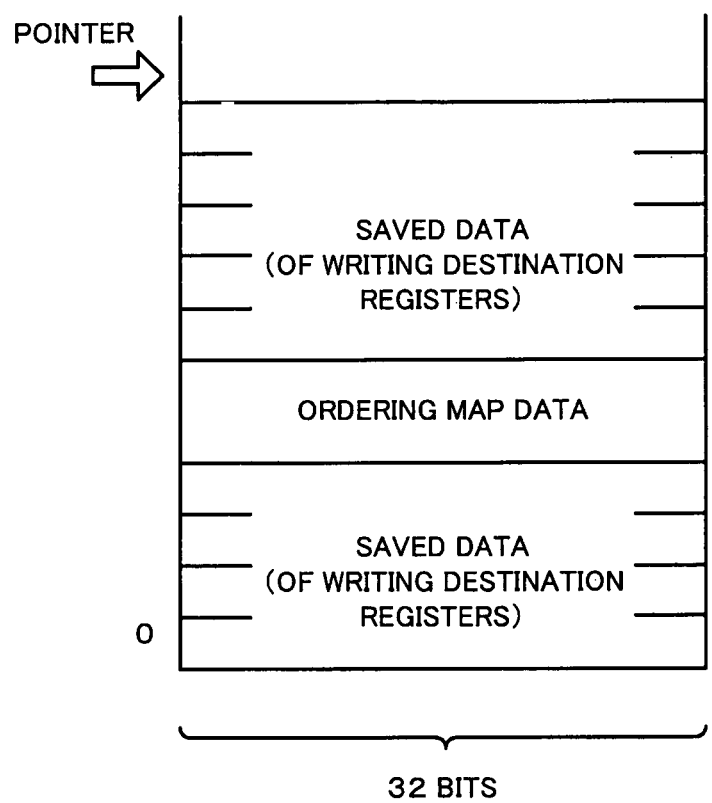
FIG. 12 shows an example of the data structure of saved data according to the second embodiment.

FIG. 12 shows an example of the data structure of saved data according to the second embodiment. The data structure shown in FIG. 12 corresponds to the data structure of the first embodiment shown in FIG. 4. That is to say, data shown in FIG. 12 is stored in the saving memory 30.

When a subroutine is called, the current ordering map data which is managed by the saving control unit 40 is saved to the saving memory 30. The value of a pointer indicates a position where data is next written, that is, the top of a free space. When the saved data is written at the position indicated by the pointer value, the pointer value is incremented. When the data saved is restored thereafter, the restoring is performed in order from the last saved data, and the pointer value is sequentially decremented.

A flow of an instruction execution process according to the second embodiment is entirely the same as that of the first embodiment shown in FIG. 5. Now, an initialization process, a saving process, and a restoring process will be described in detail.

Figure 13:
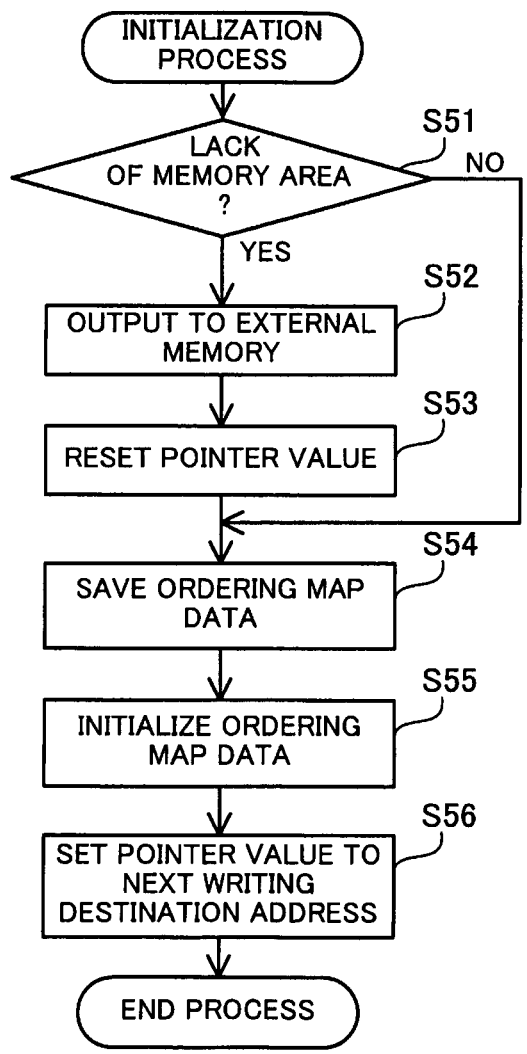
FIG. 13 is a flowchart of an initialization process according to the second embodiment.

FIG. 13 is a flowchart of the initialization process according to the second embodiment. The procedure shown in FIG. 13 will be described step by step.

At step S51, the saving control unit 40 determines whether the saving memory 30 is a lack of memory space for storing ordering map data and saved data to be saved for a next subroutine. If this determination results in yes, this procedure goes on to step S52. Otherwise, the procedure goes on to step S54.

At step S52, the saving control unit 40 moves data stored in the saving memory 30 to the external memory 2 in order from the first data.

At step S53, the saving control unit 40 initializes the pointer value to indicate the top of the saving memory 30, that is, to "0".

At step S54, the saving control unit 40 saves the current ordering map data to the saving memory 30.

At step S55, the saving control unit 40 initializes the current ordering map data. That is, the integral values of all columns of the ordering map data are set to "0".

At step S56, the saving control unit 40 sets the pointer value to a next writing destination position on the saving memory 30, that is, to the top address of a free space.

As described above, when a call instruction is executed, the saving control unit 40 saves the ordering map data to the saving memory 30 and performs the initialization process. Then, the saving control unit 40 sets the pointer value to indicate the top of the free space on the saving memory 30. If the saving memory 30 is a lack of free space, the saving control unit 40 secures a free space by moving data stored in the saving memory 30 to the external memory 2.

Figure 14:
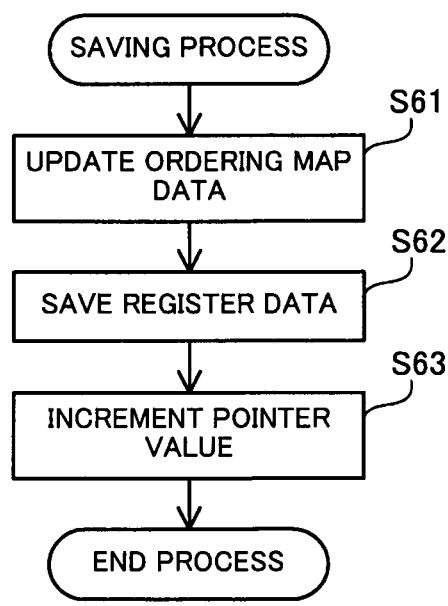
FIG. 14 is a flowchart of a saving process according to the second embodiment.

FIG. 14 is a flowchart of the saving process according to the second embodiment. The procedure shown in FIG. 14 will be described step by step.

At step 61, the saving control unit 40 sets a column corresponding to a writing destination general purpose register to an integral value indicating an order of saving, in the ordering map data.

At step 62, the saving control unit 40 reads data stored in the general purpose register before overwriting and supplies the data to the saving memory 30. The saving memory 30 writes the data at a position indicated by the pointer.

At step S63, the saving control unit 40 increments the pointer value, so that the pointer indicates the top of the free space on the saving memory 30.

As described above, when an instruction involving writing to a general purpose register is executed, the saving control unit 40 reads and saves the stored data to the saving memory 30. In addition, the saving control unit 40 records the order of saving executed for the subroutine, in the ordering map data.

Figure 15:
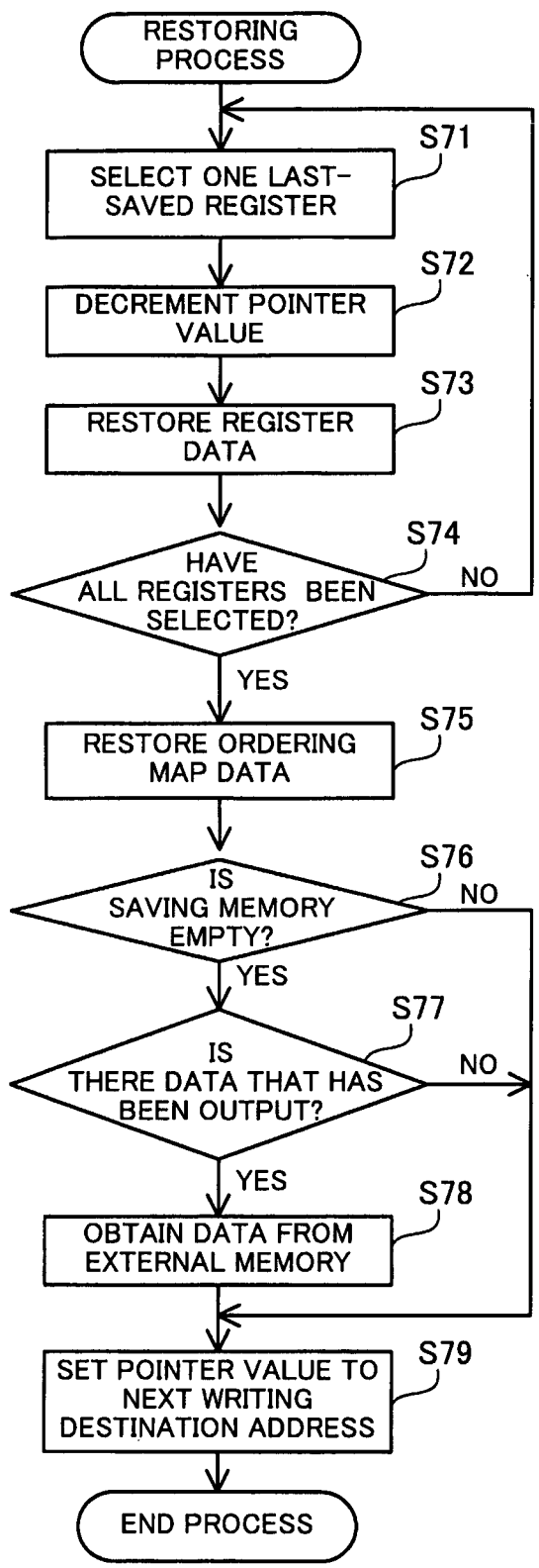
FIG. 15 is a flowchart of a restoring process according to the second embodiment.

FIG. 15 is a flowchart of the restoring process according to the second embodiment. The procedure shown in FIG. 15 will be described step by step.

At step S71, the saving control unit 40 selects one general purpose register in order from the last saved register, that is, in decreasing order of integral value included in the ordering map data.

At step S72, the saving control unit 40 decrements the pointer value, so that the pointer indicates a position where the last saved data is stored. The pointer value is supplied to the saving memory 30.

At step S73, the saving control unit 40 reads the data existing at the position indicated by the pointer from the saving memory 30. Then the saving control unit 40 stores the read data to the general purpose register selected at step S71.

At step S74, the saving control unit 40 determines whether all of the general purpose registers which was saved have been selected at step S71. If this determination results in yes, this procedure goes on to step S75. Otherwise, the procedure goes back to step S71.

At step S75, the saving control unit 40 obtains the previous ordering map data from the saving memory 30, and stores it as the current ordering map data.

At step S76, the saving control unit 40 determines whether the saving memory 30 is empty. If this determination results in yes, the procedure goes on to step S77. Otherwise, the procedure goes on to step S79.

At step S77, the saving control unit 40 determines whether there is data that has been moved from the saving memory 30 to the external memory 2. If this determination results in yes, the procedure goes on to step S78. Otherwise, the procedure goes on to step S79.

At step S78, the saving control unit 40 returns the data that has been moved before, from the external memory 2 to the saving memory 30.

At step S79, the saving control unit 40 sets the pointer value to the next writing destination position on the saving memory 30, that is, to the top address of the free space.

As described above, when a return instruction is executed, the saving control unit 40 restores data saved in the saving memory 30, back to the original general purpose registers based on the current ordering map data. Then the previous ordering map data saved in the saving memory 30 is obtained and stored as the current ordering map data. At this time, if the saving memory 30 becomes empty and there is data that has been moved from the saving memory 30 to the external memory 2, the saving control unit 40 restores the data from the external memory 2 back to the saving memory 30.

By using such a microprocessor, the saving and restoring process can be performed in parallel to computational processing, which greatly increases processing efficiency. In addition, this eliminates a need of describing explicit instructions to move data in a program, which can greatly reduce the scale of the program.

Further, the saved data and the map data are accumulated in the saving memory, so as to flexibly deal with calling subroutines in hierarchical fashion. If the saving memory is a lack of free space, data is automatically moved therefrom to the external memory. Therefore, the saving memory does not necessarily have an extremely large memory capacity.

Still further, the saved data is sequentially accumulated by using a saving memory as a stack, which increases use efficiency of the saving memory and reduces a possibility of shortage of free space.

According to the embodiments, whether the saving memory is a lack of free space is determined when a call instruction is executed. However, the space state may be always monitored. In addition, data movement between the saving memory and the external memory is performed by hardware. However, this movement may be performed by software by making an interruption to an operating system (OS).

According to this invention, a saving memory is provided in a microprocessor, data is automatically moved to the saving memory when an instruction to write to a register is executed in a subroutine, and the data is automatically restored from the saving memory back to the register when a return instruction to return from the subroutine is executed. This can greatly reduce a time required for the saving and restoring process. In addition, this eliminates a need of explicit instructions to move data, so that the program scale can be reduced.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A microprocessor capable of executing a program including calling of a subroutine, comprising:
    a register file including a plurality of registers that stores data;
    a saving memory that stores therein data saved from the registers; and
    a saving control unit that controls saving of data stored in the registers and includes a map memory unit storing map data, the map data indicating an order of saving among the registers, wherein:
    the saving control unit detects a write instruction for writing second data into one of the registers that stores first data when the write instruction is read into the microprocessor, the write instruction being included in the subroutine;

the saving control unit saves the first data stored in the one of the registers to the saving memory after the write instruction is read into the microprocessor and before the second data is written into the one of the registers according to the write instruction, and updates the map data when the first data is saved; and the saving control unit restores data saved in the saving memory back to the registers according to the order of saving indicated by the map data when a return instruction for returning from the subroutine is executed.

2. The microprocessor according to claim 1, wherein:

the saving control unit saves the map data stored in the map memory unit to the saving memory and then initializes the map data when an instruction to call the subroutine is executed; and the saving control unit restores the data back to the registers and then restores the saved map data back to the map memory unit when the return instruction is executed.

3. The microprocessor according to claim 1, wherein when the first data of the one of the registers is saved, the saving control unit generates an address indicating a position on the saving memory based on an identification number of the one of the registers and stores the first data at the position indicated by the generated address.

4. The microprocessor according to claim 1, wherein when the saving control unit detects that the saving memory is a lack of free space before the first data of the one of the registers is saved, the saving control unit secures a free space on the saving memory by moving data stored in the saving memory to an external memory connected to the microprocessor.

5. A register saving method to be executed by a microprocessor that includes a plurality of registers for storing data and is capable of executing a program including calling of a subroutine, the register saving method comprising:

detecting a write instruction for writing second data into one of the registers that stores first data when the write instruction is read into the microprocessor, the write instruction being included in the subroutine;

saving the first data stored in the one of the registers to a saving memory included in the microprocessor after the write instruction is read into the microprocessor and before the second data is written into the one of the registers according to the write instruction;

updating map data that indicates an order of saving among the registers when the first data is saved, the map data being stored in a map memory unit included in the microprocessor; and restoring data saved in the saving memory back to the registers according to the order of saving indicated by the map data when a return instruction for returning from the subroutine is executed.

6. The register saving method according to claim 5, wherein:

when an instruction to call the subroutine is executed, the map data stored in the map memory unit is saved to the saving memory and is initialized; and when the return instruction is executed, the map data saved is restored back to the map memory unit after the data is restored back to the original registers.

7. The register saving method according to claim 5, wherein when the first data of the one of the registers is saved, an address on the saving memory is generated based on an identification number that is previously given to the one of the registers, and the first data is stored at a position indicated by the generated address.

8. The register saving method according to the claim 5, wherein when it is detected that the saving memory is a lack of free space before the first data of the one of the registers is saved, a free space is secured by moving data stored in the saving memory to an external memory connected to the microprocessor.

* * * * *